(12) United States Patent
Marko et al.

(10) Patent No.: US 11,984,967 B2
(45) Date of Patent: *May 14, 2024

(54) SATELLITE PROVISIONING OF CELL SERVICE

(71) Applicant: Sirius XM Radio Inc., New York, NY (US)

(72) Inventors: Paul Marko, Pembroke Pines, FL (US); Craig Wadin, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,386

(22) Filed: Apr. 15, 2019

(65) Prior Publication Data

US 2019/0379447 A1    Dec. 12, 2019

Related U.S. Application Data

(63) Continuation of application No. 15/255,552, filed on Sep. 2, 2016, now Pat. No. 10,263,694, which is a (Continued)

(51) Int. Cl.
*H04W 4/60* (2018.01)
*B64G 1/00* (2006.01)
(Continued)

(52) U.S. Cl.
CPC ........... *H04B 7/18563* (2013.01); *B64G 1/00* (2013.01); *H04B 7/18517* (2013.01);
(Continued)

(58) Field of Classification Search
CPC ............ H04B 7/18553; H04B 7/18563; H04B 7/18517; H04B 7/18541; H04B 7/18573;
(Continued)

(56) References Cited

U.S. PATENT DOCUMENTS 8,863,256 B1 * 10/2014 Addepalli ......... H04W 72/0406
726/7
8,965,366 B1 * 2/2015 Somayajula .......... H04W 60/00
455/418
(Continued)

*Primary Examiner* — Barry W Taylor
(74) *Attorney, Agent, or Firm* — Kramer Levin Naftalis & Frankel LLP

(57) ABSTRACT

Satellite provisioning of cell service for an in-vehicle telematics control unit ("TCU") is presented. Thus, a truly carrier independent TCU is facilitated. A TCU may be provided with a cellular modem and two or more SIM cards, each associated with a cellular carrier that has approved the modem and their SIM card. The TCU may also be provided with connectivity to a satellite, such as, for example, via an SDARS antenna and processing module, that can receive and process SDARS audio and data signals. When a user desires to change from one of the cellular carriers to another, provisioning data for the new carrier's SIM, now already in the telematics system, may be (i) sent over the satellite, (ii) received at the satellite antenna, and (iii) passed to a telematics processor. The telematics processor, in turn, may (iv) deliver the provisioning data to the cell modem, which may then (v) program the appropriate SIM with the provisioning data, thus allowing cellular communications on the new carrier's network. The inventive functionality facilitates easily switching carriers as one crosses a border, or when a new vehicle is imported to a given country, and cellular service then or there available on one of the approved carriers is easily chosen by a user and turned on. The TCU may also include a Wi-Fi module, configured to receive provisioning instructions or data over a Wi-Fi network.

16 Claims, 6 Drawing Sheets

Carrier Independent
Telematics Control Unit with Integrated SDARS

1. With cell modem subscribed to Cellular Carrier 1, SDARS transmits provisioning data for Carrier 2 to SDARS receiver.
2. SDARS receiver passes provisioning data to Telematics processor.
3. Telematics processor delivers provisioning data to cell modem.
4. Cell modem programs appropriate SIM (SIM 2) with provisioning data.
5. Based on instructions in provisioning data from SDARS network, Cell modem restarts using SIM2 and communicates on Cellular Carrier 2 network with provisioning data received from SDARS network.

Related U.S. Application Data continuation-in-part of application No. PCT/US2015/018792, filed on Mar. 4, 2015.

(60) Provisional application No. 61/947,955, filed on Mar. 4, 2014.

(51) Int. Cl.

| | | |
|---|---|---|
| *H04B 7/185* | (2006.01) | |
| *H04H 40/90* | (2008.01) | |
| *H04H 60/13* | (2008.01) | |
| *H04H 60/91* | (2008.01) | |
| *H04L 41/0806* | (2022.01) | |
| *B64G 1/66* | (2006.01) | |
| *H04L 67/12* | (2022.01) | |

(52) U.S. Cl.
CPC ..... *H04B 7/18541* (2013.01); *H04B 7/18573* (2013.01); *H04H 40/90* (2013.01); *H04H 60/13* (2013.01); *H04H 60/91* (2013.01); *H04L 41/0806* (2013.01); *B64G 1/66* (2013.01); *H04L 67/12* (2013.01)

(58) Field of Classification Search
CPC ........ H04H 30/90; H04H 60/13; H04H 60/91; H04L 41/0806; H04L 67/12; B64G 1/66; H04W 12/35; H04W 4/60; H04W 88/06; H04W 8/265

See application file for complete search history.

(56) References Cited

U.S. PATENT DOCUMENTS

| | | | | |
|---|---|---|---|---|
| 2004/0023647 | A1* | 2/2004 | Mazzara, Jr. | H04B 7/1853 455/419 |
| 2006/0183500 | A1* | 8/2006 | Choi | H04W 8/265 455/558 |
| 2008/0020755 | A1* | 1/2008 | Liu | H04W 8/245 455/432.1 |
| 2009/0119657 | A1* | 5/2009 | Link, II | G06F 8/65 717/171 |
| 2009/0127328 | A1* | 5/2009 | Aissa | G10L 17/00 235/377 |
| 2009/0247138 | A1* | 10/2009 | Sennett | H04M 1/72525 455/418 |
| 2012/0034882 | A1* | 2/2012 | Kauffman | H04B 1/3822 455/73 |
| 2013/0023235 | A1* | 1/2013 | Fan | H04W 12/35 455/418 |
| 2013/0095881 | A1* | 4/2013 | Wieczorek | H04W 8/26 455/551 |
| 2013/0102306 | A1* | 4/2013 | Sachanandani | H04W 8/06 455/432.2 |
| 2013/0109436 | A1* | 5/2013 | Tat | H04W 8/183 455/558 |
| 2015/0148020 | A1* | 5/2015 | Laden | H04W 12/08 455/418 |
| 2015/0181419 | A1* | 6/2015 | Mistry | G06F 9/445 455/419 |
| 2015/0215844 | A1* | 7/2015 | Davis | H04W 8/12 455/432.1 |
| 2015/0237497 | A1* | 8/2015 | Chen | H04W 8/183 455/558 |
| 2015/0289140 | A1* | 10/2015 | Rudolph | H04W 8/205 455/411 |
| 2015/0319603 | A1* | 11/2015 | Faller | H04W 12/06 455/432.1 |
| 2015/0373778 | A1* | 12/2015 | Holtmanns | H04W 88/06 455/558 |
| 2017/0332274 | A1* | 11/2017 | Link | H04M 15/8038 |

\* cited by examiner

Conventional Telematics Control Unit (TCU)

Carrier Independent
Telematics Control Unit with Integrated SDARS

LTE Modem Certified On Two Carrier Networks With Independent SIMs
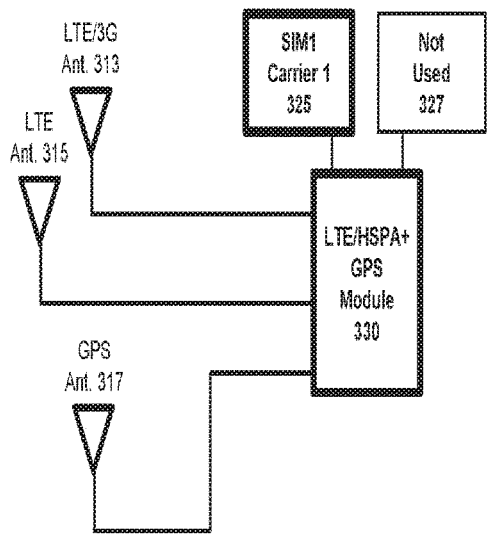
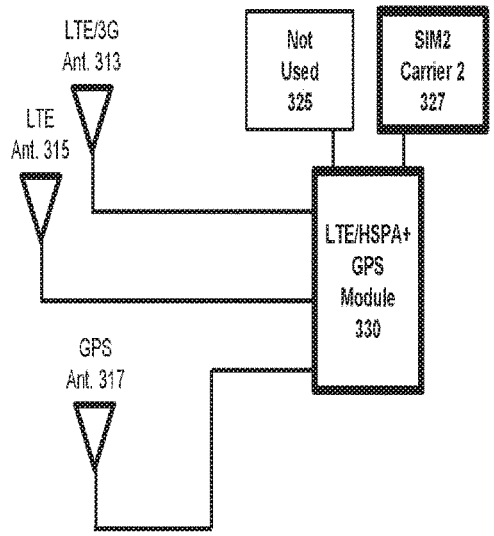
FIG. 3A. LTE/HSPA + GPS Modem is certified on Carrier Network 1 using SIM1
FIG. 3B. LTE/HSPA + GPS Modem is certified on Carrier Network 2 using SIM2

FIG. 4

Carrier Independent
Telematics Control Unit with Integrated SDARS

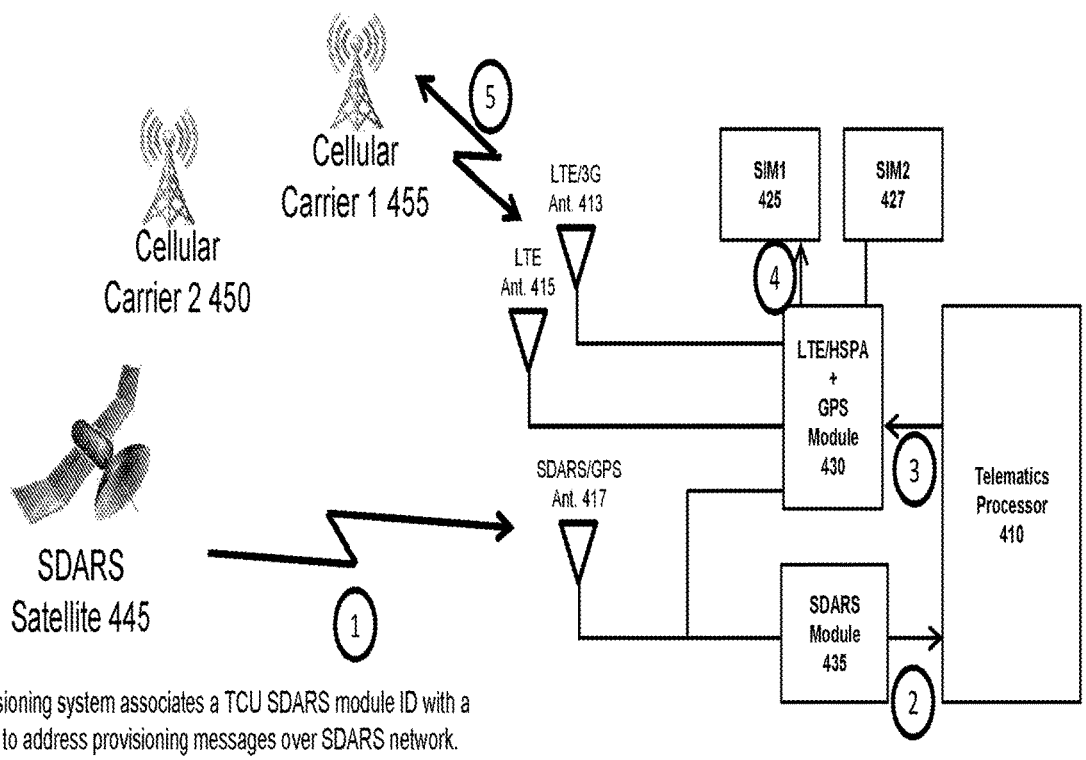

Note: Provisioning system associates a TCU SDARS module ID with a cellular ID to address provisioning messages over SDARS network.

1. SDARS transmits provisioning data to the SDARS receiver.
2. SDARS receiver passes provisioning data to Telematics processor.
3. Telematics processor delivers provisioning data to cell modem.
4. Cell modem programs appropriate SIM (SIM 1) with provisioning data.
5. Cell modem communicates on Cellular Carrier 1 network with provisioning data received from SDARS network.

FIG. 5

Carrier Independent
Telematics Control Unit with Integrated SDARS

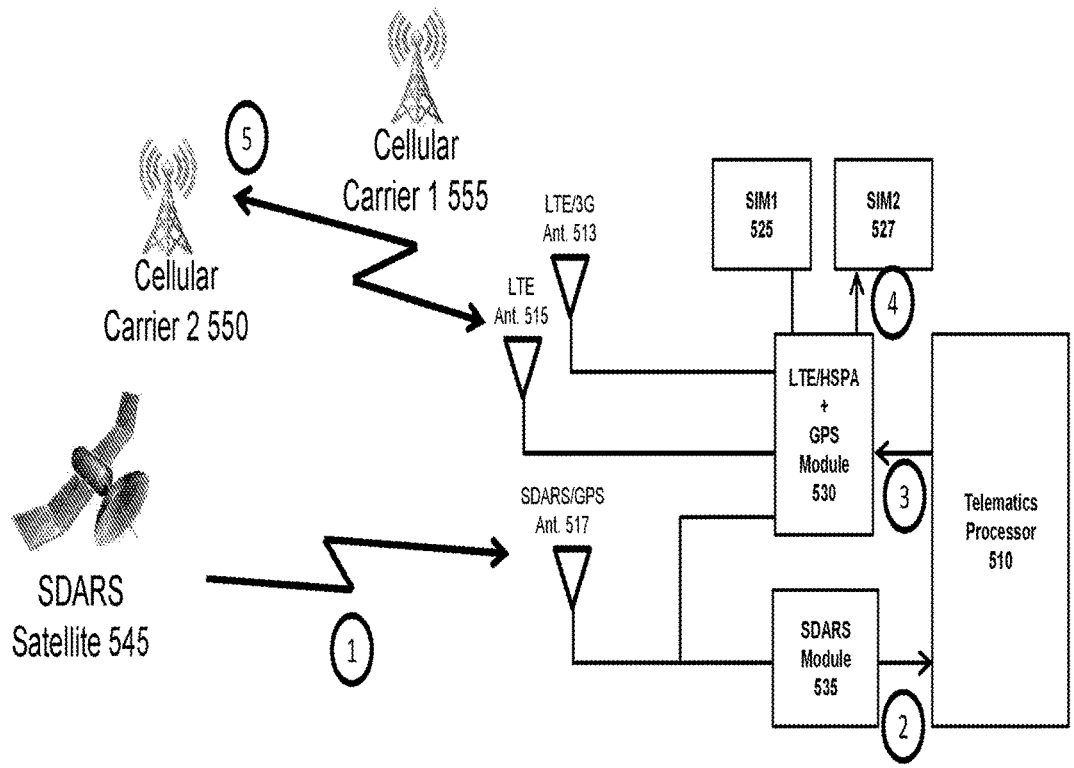

1. With cell modem subscribed to Cellular Carrier 1, SDARS transmits provisioning data for Carrier 2 to SDARS receiver.
2. SDARS receiver passes provisioning data to Telematics processor.
3. Telematics processor delivers provisioning data to cell modem.
4. Cell modem programs appropriate SIM (SIM 2) with provisioning data.
5. Based on instructions in provisioning data from SDARS network, Cell modem restarts using SIM2 and communicates on Cellular Carrier 2 network with provisioning data received from SDARS network.

FIG. 6

Carrier Independent Telematics Control Unit with Integrated SDARS

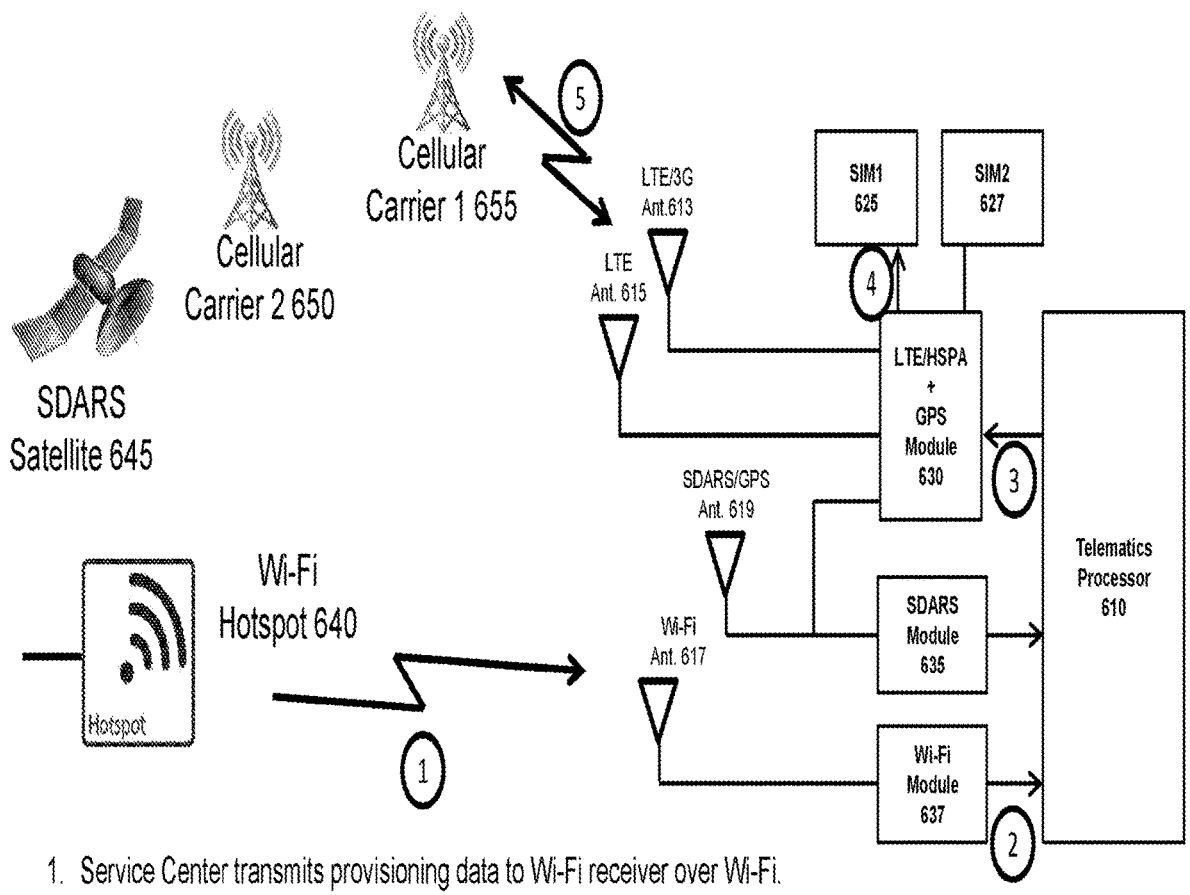

1. Service Center transmits provisioning data to Wi-Fi receiver over Wi-Fi.
2. Wi-Fi receiver passes provisioning data to Telematics processor.
3. Telematics processor delivers provisioning data to cell modem.
4. Cell modem programs appropriate SIM (e.g., SIM 1) with provisioning data.
5. Cell modem communicates on Cellular Carrier 1 network with provisioning data received from Wi-Fi network.

SATELLITE PROVISIONING OF CELL SERVICE

CROSS-REFERENCE TO RELATED APPLICATIONS

The present application is a continuation application of U.S. patent application Ser. No. 15/255,552, filed on Sep. 2, 2016, which issued as U.S. Pat. No. 10,263,694 on Apr. 16, 2019, which is a continuation-in-part of PCT/US2015/018792, which was published as WO/2015/134644, and also claims the benefit of U.S. Provisional Patent Application No. 61/947,955, filed on Mar. 4, 2014, entitled "SATELLITE PROVISIONING OF CELL SERVICE", the contents of each of these applications are incorporated herein by reference in their entireties.

TECHNICAL FIELD

The present invention relates to telematics systems, and in particular to in-vehicle telematics systems having satellite as well as cellular network connectivity, where a satellite communications channel may be used to provision in-vehicle cellular modem(s) for multiple cellular carriers.

BACKGROUND OF THE INVENTION

Conventional telematics systems, such as, for example, those provided in vehicles, have an integrated cellular modem that allows such systems to communicate with the outside world. Conventionally, the cellular modems in telematics systems have a dedicated Subscriber Identity Module ("SIM") card, and thus are tied to a particular carrier, in similar fashion to most mobile phones. A vehicle owner or user must therefore establish an account with that sole carrier (e.g., Verizon, T-Mobile, ATT, etc.) in order to use the telematics device.

A SIM card is a portable memory chip used mostly in cell phones that operate on the Global System for Mobile Communications (GSM) network. They are also used in 3GPP and 4G networks. These cards hold the personal information of the account holder, including his or her phone number, address book, text messages, and other data. When a user wants to change cellular phones, he or she can usually easily remove the card from one handset and insert it into another. SIM cards are convenient and popular with many users, and are a key part of developing cell phone technology.

Since all of a user's data is tied to the SIM card, only it needs to be activated when the person opens an account with a cell phone service provider (also called a carrier). Each card has a unique number printed on the microchip, which the carrier needs to activate it. In most cases, the phone's owner can go either to the carrier's website and enter this number in the appropriate tool or call the service provider directly from another phone to get it turned on. SIM cards are tied to a particular carrier and can only be used with a service plan from that carrier.

The situation is different as regards SIM cards in telematics devices. Often, following the purchase of a vehicle, an operator of a telematics service, or alternatively, an owner or user of the vehicle having the telematics device, may desire to change cellular carriers. This requires opening up the telematics device, switching out the SIM card with one provided by another carrier, and then provisioning the device. However, once the former carrier's SIM card is no longer available to the device, there are no longer any communications pathways available to it, and thus no way to provision, the replaced SIM card—even if this somewhat difficult process were to be undertaken.

Moreover, in actuality this process is almost never performed, and is not at all practical. Unlike mobile phones, accessing the SIM card in a built-in telematics device is not an easily performed task. Such a task requires opening up a built-in telematics device, accessing its cellular modem, switching out its SIM card, and then contacting a carrier from whom a new SIM card has been obtained, and provisioning it. For obvious reasons, this is unrealistic in the real world. Thus, in general, vehicle owners and telematics service operators remain tied to the carrier whose SIM card was originally included in the telematics device.

As a result, the conventional telematics device has one SIM card in it, and that card is not compatible with other carriers. Moreover, the telematics service provider generally has a contract with the carrier provider, so there is really no chance that a vehicle owner has any option to switch carriers in the conventional system.

What is therefore needed in the art is more flexibility in how in-vehicle telematics devices access cellular networks, including, if desired, ways to switch carriers, and easily accomplish provisioning of the in-vehicle modem to a new cellular carrier's network. This requires additional hardware and software to be provided in telematics devices to facilitate such switching and provisioning.

What is further needed in the art is an easy way for a user of a telematics service to change cellular carriers, simply by deciding to be on a new network.

SUMMARY OF THE INVENTION:

Satellite provisioning of cell service for an in-vehicle telematics control unit ("TCU") is presented. Thus, a truly carrier independent TCU is facilitated. A TCU may be provided with a cellular modem and two or more SIM cards, each associated with a cellular carrier that has approved the modem and their SIM card. The TCU may also be provided with connectivity to a satellite, such as, for example, via an SDARS antenna and processing module, that can receive and process SDARS audio and data signals. When a user desires to change from one of the cellular carriers to another, provisioning data for the new carrier's SIM, now already in the telematics system, may be (i) sent over the satellite, (ii) received at the satellite antenna, and (iii) passed to a telematics processor. The telematics processor, in turn, may (iv) deliver the provisioning data to the cell modem, which may then (v) program the appropriate SIM with the provisioning data, thus allowing cellular communications on the new carrier's network. The inventive functionality facilitates easily switching carriers as one crosses a border, or when a new vehicle is imported to a given country, and cellular service then or there available on one of the approved carriers is easily chosen by a user and turned on.

In some exemplary embodiments, an SDARS service provider may also provide telematics services, as well as distribute cellular service for multiple cellular carriers. In such cases, to change cellular service a user need not contact the new cellular carrier, but rather may simply contact the SDARS provider, who handles all of the details of the carrier change, making life easy for any user who is a customer of the SDARS service. In effect, all in-vehicle connectivity may be provided, and handled, by such an SDARS provider.

The TCU may also include a Wi-Fi module, configured to receive provisioning instructions or data over a Wi-Fi network.

BRIEF DESCRIPTION OF THE DRAWINGS

FIGS. 3A and 3B illustrate two respective versions of the left side of FIG. 2, showing an exemplary LTE modem that is certified on two carrier networks with independent SIMs according to an exemplary embodiment of the present invention;

FIG. 4 illustrates an exemplary process of provisioning the carrier independent telematics control unit of FIG. 3A according to an exemplary embodiment of the present invention;

FIG. 5 illustrates an exemplary process of provisioning the carrier independent telematics control unit of FIG. 3B to connect to Carrier 2's network while already being subscribed to Carrier 1's network according to an exemplary embodiment of the present invention; and FIG. 6 illustrates the exemplary process of FIG. 4 where the provisioning data is transmitted to the carrier independent telematics control unit with an integrated SDARS receiver and Wi-Fi receiver over a WiFi network.

DETAILED DESCRIPTION OF THE INVENTION

1. Introduction

The following scenario is considered: a Telematics Service Provider ("TSP") is creating a 3G system, using 3G compatible units in vehicles. The preferred 3G carrier at the inception of the system, say in 2014, has decided that they are going to sundown their 3G network around 2021. If, for example, the modem provided in the telematics control unit ("TCU") is desired to be used in automobile model years through and including the 2016-2017 model year, those modems will only be viable for a short five year period, i.e., they will essentially be cut off from being able to provide service sometime during 2020-2021. It would thus be useful if the TSP had the capability to accept that fact, and then plan to switch over to another 3G carrier at that cut-off time, and thus continue to offer service with the same hardware.

Another scenario might be, for example, that the TSP wants to provide hardware in a vehicle that is initially not provisioned to any carrier, and then subsequently provision it at the time it desires to begin doing business with that device.

Because a TSP can be the same as, or may be associated with, a satellite radio service provider, such as assignee hereof Sirius XM Radio Inc., it is an organic development to provide telematics hardware containing cellular modems in a vehicle together with satellite radio receivers, often in integrated devices. It is also natural to utilize not only the cellular communications channel from an in-vehicle telematics device, but also to use the other available communications channel into a vehicle—the satellite radio broadcast channel—in various synergetic ways to facilitate the provisioning of cellular service.

These exemplary scenarios, and various extensions and combinations thereof, motivate various exemplary embodiments of the present invention.

2. Conventional TCU Configuration

Figure 1:
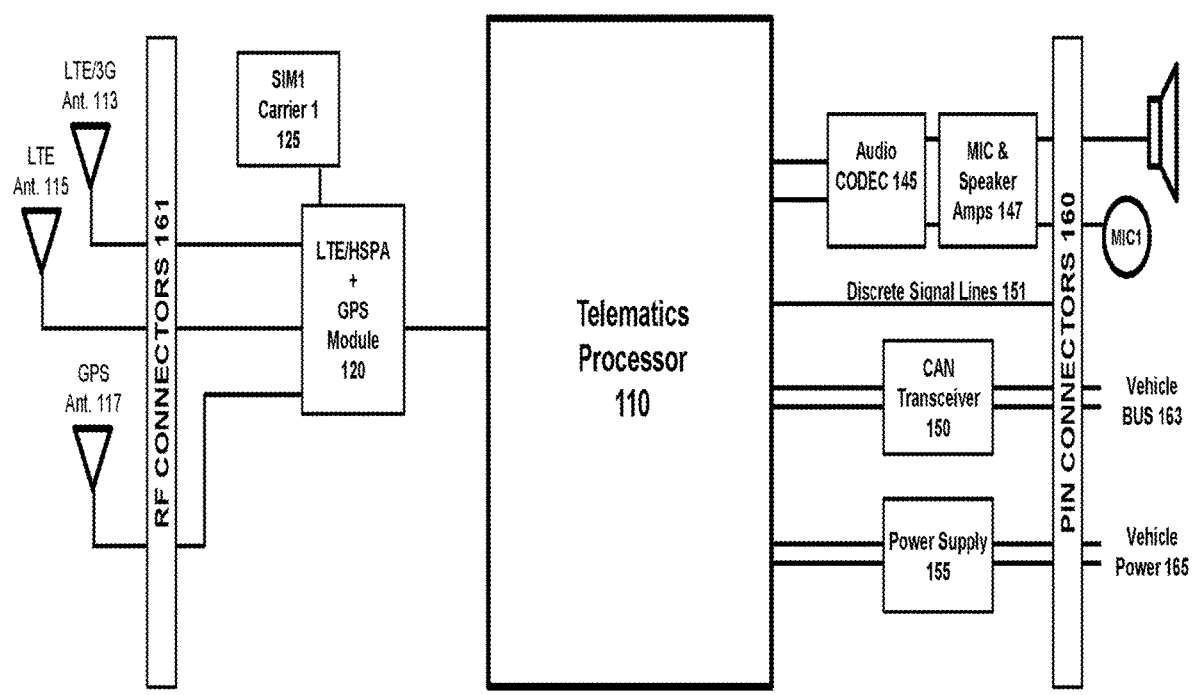
FIG. 1 depicts a conventional telematics control unit (TCU)

FIG. 1 illustrates a telematics control unit ("TCU") as known in the prior art. With reference thereto, there is shown a Telematics Processor 110 in the center of the figure. It is connected, as shown on the right side of FIG. 1, to various elements of an in-vehicle telematics system. These include Audio CODEC 145, Microphone and Speaker Amplifiers 147, CAN Transceiver 150, and Power Supply 155. These elements, in turn, are connected via Pin Connectors 160 to Microphone MIC1, Vehicle Bus 163 and Vehicle Power 165. Telematics Processor 110 is also connected directly to Pin Connectors 160 via Discrete Signal Lines 151. It is noted that the CAN refers to the Controller Area Network, also known as the CAN Bus, which is a vehicle bus standard designed to allow electronic control units and devices to communicate with each other in applications without a host computer.

As shown on the left side of FIG. 1, Telematics Processor 110 is connected to a communications system by which the telematics processor receives signals from various sources outside the vehicle (it may also transmit back to these sources, as the case may be). These sources may include, for example, a GPS signal source as well as an LTE network signal or an LTE/3G network signal. These GPS, LTE and/or LTE/3G signals are received at GPS Antenna 117, LTE Antenna 115 and LTE/3G Antenna 113, respectively, and are fed to LTE/HSPA and GPS Module 120 via RF Connectors 161, as shown. The signals are then passed to Telematics Processor 110 from LTE/HSPA and GPS Module 120. As can be seen in FIG. 1, there is only one data network carrier that the telematics system accesses, namely Carrier 1, via SIM1 125 which is provisioned for Carrier 1, and connected to (and generally integrated in) LTE/HSPA and GPS Module 120. Thus, a user of the telematics system depicted in FIG. 1 must be a customer, directly or indirectly, of Carrier 1.

3. Novel "Carrier-Independent" TCU

Figure 2:
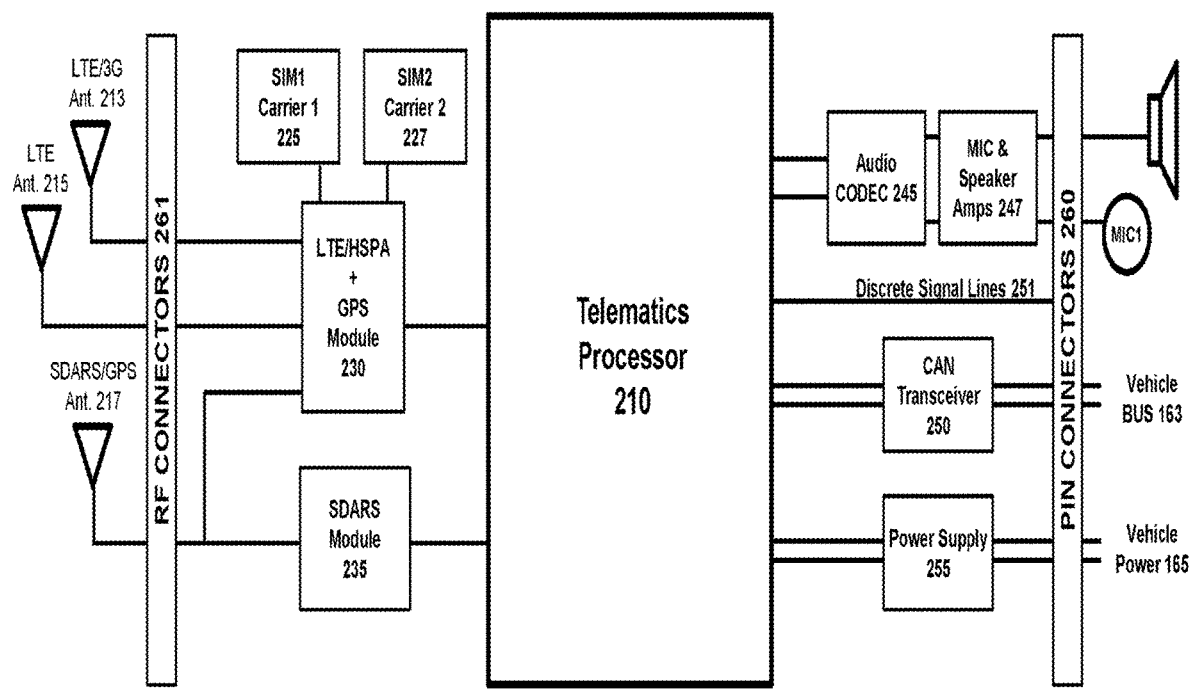
FIG. 2 illustrates a carrier independent telematics control unit with an integrated SDARS receiver according to an exemplary embodiment of the present invention.

FIG. 2 shows an exemplary carrier independent TCU with an integrated SDARS Module 235 according to an exemplary embodiment of the present invention. The system of FIG. 2 shown on the right side of the figure is identical to that of FIG. 1's right side, and index numbers ending in the same two digits between FIGS. 1 and 2 refer to equivalent elements, and are not described again.

The differences between FIGS. 1 and 2 are thus on the left side of the figures, where in the system of FIG. 2 multiple SIM cards are provided, as well as an SDARS Module 235. The exemplary system of FIG. 2 can be implemented in vehicles that are equipped both with an LTE antenna 213 and/or an LTE /3G antenna 215, as well as an antenna that is capable of receiving an SDARS signal, such as SDARS/ GPS Ant. 217, as shown. In various exemplary embodiments the SDARS antenna can be separate from, or may, for example, be combined/integrated with a GPS antenna, as may be desired or convenient in various contexts. As shown in FIG. 2, there are 2 SIMs—SIM 1 225 and SIM 2 227, each associated with a separate carrier, Carrier 1 and Carrier 2, respectively. The SIMs both feed into the LTE/HSPA+GPS module 230. Therefore, the telematics control unit of FIG. 2 can actually potentially work with either carrier, i.e., either Carrier 1 or Carrier 2, and therefore a user, or a telematics service company, as the case may be, can switch between carriers should that be desired or convenient in various contexts.

It is here noted that the number of carriers provided for is in no way limited to two, and in various embodiments it may be desirable to have 3, 4, or 5, or even more carriers approve a given carrier independent TCU, such as is depicted in FIG.

2, at the time it is built, to give maximum flexibility. This is, of course, to be balanced with the additional costs of SIMs and the contractual arrangements needed to obtain carrier approval. It is also necessary to factor in additional bands support for the additional carrier frequency bands, and appropriate contractual arrangements to be able to use any carrier associated with the additional SIMs. Thus, where multiple carriers are supported by the telematics system, there will be multiple SIMs connected to the LTE/HSPA+ GPS Module 230 in FIG. 2, as opposed to the two SIMs now shown.

It is also noted that in some embodiments it is theoretically possible to not need multiple SIMs at all, one SIM sufficing, assuming that the different carriers supported would or will agree on a standard for programmable SIM cards, or the like, such as has been done in Europe, which allows one SIM to be programmed to work with many carriers.

FIGS. 3 provide further details of the LTE/HSPA+GPS module shown in FIG. 2. FIGS. 3A and 3B are each an abstracted version of the left side of FIG. 2 (without showing the RF Connectors 261). FIGS. 3A and 3B illustrate that the LTE/HSPA+GPS module 330 may, for example, be pre-certified on two carrier networks, each with an independent SIM, and therefore the inventive TCU is able to switch between Carrier 1 and Carrier 2, as noted above. FIG. 3A illustrates the case where the LTE/HSPA+GPS Modem is certified on Carrier Network 1, using SIM 1 325 (outlined in thick black), and thus the other SIM, SIM2 327 is not used. In a wholly complementary manner, FIG. 3B illustrates the case where the LTE/HSPA+GPS Modem is certified on Carrier Network 2, using SIM 2 327 (outlined in thick black), and thus the other SIM, SIM1 325 is not used. It is noted that in general it is required to obtain approval of the multiple SIMs from their respective carriers at the outset (i.e., when building the TCU), as carriers generally require knowing all of the hardware that is being used in a device they will interoperate with. Thus, in most embodiments, a business relationship needs to be negotiated to facilitate any switching of carriers down the line.

In this context it is noted that where a carrier is not subsidizing up-front the hardware it is easier to obtain such assent. For example, an exemplary Telematics Service Provider ("TSP") may choose to forego any subsidy on the modem itself, and only take a portion of any data plan that it later sells to a customer. In such cases that sale can be, for example, the trigger point for the TSP to obtain a subsidy. In such a scenario it is in the carrier's interest actually to approve the multi-carrier hardware ab initio. I.e., the deal is that the TSP is not asking for a subsidy upfront, but wants a given carrier to approve the multi-carrier capable modem, and will try to subsequently sell that carrier's plan if they can. This arrangement does not cost the carrier anything at all (i.e., no hardware subsidy is requested upon building or approval of the hardware), and the carrier need only give the TSP a cut if they actually sell its plan to consumers. In general it is believed that under these terms most carriers would desire to go along with approving the hardware for use with their service. This is simply because if they do not participate then there is a guarantee that any revenue stream will be with the other carriers whose SIMs are provided on the TCU. Conversely, if they do participate they have a chance at capturing some revenue.

Moreover, to facilitate such a contemplated switch between carriers, a TSP can agree to route all of their telematics data traffic—in addition to the customer's specific traffic—to the new carrier at some rate that is agreed upon up-front. So, for example, in the U.S., the TSP could go into the Verizon™ network, or the AT&T™ network, sell the consumer a data plan in the chosen network, and at the same time bring the utility data that is being used for the telematics services to the new network as well as a "sweetener." So the TSP may bring the business to either carrier. While the bulk of that business would be the money that the carrier would be making from its customers, i.e., from the data that plan each user must sign up for, the chosen carrier would also be able to make money from the telematics utility data. In some embodiments, such a TSP may be associated with an SDARS (Satellite Digital Audio Radio Service) provider, for example.

4. Provisioning the Novel "Carrier-Independent" TCU

FIGS. 4-6, next described, illustrate various steps in exemplary processes according to embodiments of the present invention for provisioning a carrier independent telematics control unit with an integrated SDARS module as shown in FIG. 2. These steps are indicated in FIGS. 4-6 by Arabic numerals within circles placed next to the relevant hardware element involved in a given step. The various steps are also listed at the bottom of each figure together with a brief description.

Provisioning Over SDARS

FIG. 4 illustrates a carrier independent TCU with integrated SDARS module, as shown in FIGS. 3, with the provisioning steps added, as described above. With reference to FIG. 4, its right side is essentially identical to the telematics processor 210 as shown in FIG. 2, as well as the various elements and connections to the left of telematics processor 210, all as shown in FIG. 2. Therefore, in FIG. 4 there can be seen 2 SIMs, SIM 1 425 and SIM2 427, each associated with a different carrier, and each communicably connected to an LTE/HSPA+GPS module 430 which is configured to process these various signals. Module 430 is itself communicably connected to Telematics Processor 410. Telematics Processor 410 is also connected to SDARS Module 435, which processes satellite radio (SDARS) signals that may be received at SDARS/GPS Ant. 417. The TCU can thus receive signals over antennae LTE/3G 413, LTE 415, and SDARS/GPS 417. With continued reference to FIG. 4, the following steps, being steps 1 through 5, may be performed in an exemplary provisioning process.

First, at Step 1, beginning at the far left of FIG. 4, the SDARS satellite 445 may transmit provisioning data, which can be received in the vehicle at SDARS/GPS Antenna 417, and then forwarded to an SDARS receiver contained in SDARS module 435. To facilitate Step 1, the provisioning system associates a TCU SDARS Module ID with a cellular ID so as to address provisioning messages over the SDARS network.

Once the SDARS receiver in SDARS Module 435 receives the provisioning data, at Step 2 it can pass the provisioning data to Telematics Processor 410. Telematics Processor 410 may then deliver the provisioning data to a cellular modem in LTE/HSPA+GPS module 430 at Step 3. Following that, at Step 4, the cellular modem programs an appropriate SIM, in this case SIM 1 425, with the provisioning data. Finally, at Step 5, the now provisioned cellular modem can communicate over Cellular Carrier 1's network using the provisioning data which it originally received from the SDARS network, from SDARS satellite 445 via SDARS/GPS antenna 417.

It is noted that neither Cellular Carrier 2 450, nor SIM2 427 is involved in the process shown in FIG. 4. As noted, and as shown in FIG. 4, the described provisioning system associates a TCU SDARS module ID with a cellular ID to address provisioning messages over the SDARS network. In various exemplary embodiments, the SDARS provider would connect the two IDs.

It is noted that in order for an SDARS provider to have such provisioning ability, it may enter into a contract with a carrier, say for example Verizon™ or AT&T™. Verizon™ or AT&T™ may then give out a block of numbers to the SDARS provider, and those numbers may then be programmed into the production volume of automobiles that have an SDARS radio and TCU in a vehicle. That block of numbers will eventually will get turned on, but generally the block size is only enough to support such production volume. In most arrangements, the carriers may not give out a year's production at once, but rather they may generally give it out as the vehicles are being built.

Provisioning A New Carrier's SIM Over SDARS While Already Subscribed To Another Carrier FIG. 5 illustrates an almost identical process as that shown in FIG. 4, except that here an actual change of carriers is depicted. Thus, in Step 1 of FIG. 5, while the cellular modem in LTE/HSPA+GPS Module 530 is already subscribed to Cellular Carrier 1 555's network (having been provisioned, for example, as per the process described above in connection with FIG. 4, or via another process), SDARS satellite 545 transmits provisioning data for the other cellular carrier, namely Cellular Carrier 2 550. The Carrier 2 provisioning data is received via SDARS/GPS Antenna 517 at the SDARS receiver embedded in SDARS Module 535, and at Step 2, this Carrier 2 provisioning data is passed to Telematics Processor 510. Telematics Processor 510 may then deliver the provisioning data to the cellular modem in LTE/HSPA+GPS module 530 at Step 3. Following that, at Step 4, the cellular modem programs the now appropriate SIM—SIM 2 527—with the provisioning data. Finally, at Step 5, the cellular modem, based on instructions in the provisioning data received from the SDARS network, restarts using SIM 2 and thereafter communicates on Cellular Carrier 2's network 550 using the provisioning data originally received from the SDARS network via SDARS Satellite 545.

It is noted that with the disclosed approach, when a customer decides not to use a number any longer, an SDARS provider or TSP (and in many cases they will be one entity) can just immediately give the number back to the carrier, and thus incur no carrying costs associated with the number. If and when the customer is ready to re-subscribe, it is a simple task for the SDARS/TSP to issue another number to that customer, using one of the numbers that it has on-hand in a block of numbers that is has obtained from the carrier, as described above.

The exemplary process of FIG. 5 is in contrast to the current conventional situation, where, without the ability to provision via a SDARS communications channel as shown in FIGS. 4 and 5, if the TSP wanted to keep a number available following a customer shutting off his or her service, the TSP would have to pay a monthly fee to the carrier for that number in order to be able to reuse it later. Exemplary embodiments of the present invention obviate that need (and cost).

Provisioning Over Wi-Fi

Finally, in an alternate exemplary embodiment, FIG. 6 illustrates a carrier independent TCU with integrated SDARS Module, and also having an integrated Wi-Fi Module 637. Besides the additional Wi-Fi hardware, the system of FIG. 6 is identical to that shown in FIG. 4. Thus, there are 2 SIMs, SIM1 625 and SIM2 627, each associated with a different carrier, and each communicably connected to an LTE/HSPA+GPS module 630 which is configured to process these various signals. Module 630 is itself communicably connected to Telematics Processor 610. Telematics Processor 610 is also connected to SDARS Module 635, which processes satellite radio (SDARS) signals that may be received at SDARS/GPS Ant. 619, and, as noted, additionally connected to Wi-Fi Module 637. The TCU can thus receive signals over antennae LTE/3G Ant. 613, LTE Ant. 615, SDARS/GPS Ant. 619, and Wi-Fi Ant. 617.

Leveraging the additional hardware component, in the process illustrated in FIG. 6, the transmission of provisioning data is not from SDARS Satellite 645 but rather from a Wi-Fi hot spot 640. To be able to do this, as noted, the TCU of FIG. 6 also has a Wi-Fi Module 637 connected to a Wi-Fi antenna 617. Thus, the system of FIG. 6 allows provisioning from any of the depicted sources, namely cellular carrier, SDARS Satellite, or Wi-Fi network, and thus offers maximum flexibility.

With reference to FIG. 6, beginning at the bottom left of the figure, at Step 1 a service center may transmit provisioning data for a cellular carrier network to a Wi-Fi receiver over Wi-Fi. The provisioning data is received at the TCU via Wi-Fi antenna 617. At Step 2 a Wi-Fi receiver within Wi-Fi module 637 passes the received provisioning data to telematics processor 610. At Step 3 telematics processor 610 delivers the provisioning data to a cellular modem within LTE/HSPA+GPS Module 630, as described above. At Step 4 cellular modem within LTE/HSPA+GPS Module 630 programs the appropriate SIM (in this example SIM 1 625 for Carrier 1 655—but it could just as likely be SIM 2 627 for Carrier 2 650) with the received provisioning data. Finally, at step 5 the cell modem within 620 communicates on Cellular Carrier 1's network with the provisioning data received from the Wi-Fi network.

Provisioning A New Carrier's SIM Over Wi-Fi While Already Subscribed To Another Carrier Although not explicitly shown in FIG. 6 or an equivalent figure, the same change of carrier process as described in connection with FIG. 5, where the TCU is already a subscriber of Carrier 1 could also be implemented in a completely analogous manner by sending the provisioning data for the new carrier, Carrier 2, over Wi-Fi Hotspot 640, thereby effecting a change of carrier in the manner described in connection with FIG. 5, but using the Wi-Fi communications path to transmit the provisioning data, as shown in the exemplary system and process of FIG. 6.

5. Exemplary Apparatus; TCU Provided With Appropriate Computer Implementable Instructions Various embodiments of the present invention can be implemented with one or more apparatuses to perform the operations described herein. These apparatuses may be specially constructed for the required purposes, or may comprise a computer system that is selectively activated or reconfigured by a computer program which it executes and which is stored on one or more computer-readable storage mediums accessible to processing elements of the computer system. For example, such a computer program may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, hard drives or other forms of magnetic or optical storage media, or any type of media suitable for storing electronic instructions, and each accessible to a computer processor, e.g., by way of a system bus or other communication means.

As described above, there are various steps that occur upon receipt of the provisioning data by the TCU. These steps or processes may be implemented in software, firmware or the like, and stored in, or in communication with, the TCU. It is important to recognize that embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose. In view of the above, it should be appreciated that some portions of the description above are presented in terms of algorithms and symbolic representations of operations on data within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It will prove convenient at times, principally for reasons of common usage, to refer to these signals as data, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it is understood that throughout the description of the present invention, use of terms such as "processing", "computing", "calculating", "determining", or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission or display devices.

6. Exemplary Use Cases

Because various exemplary embodiments of the present invention allow an entity different than a cellular carrier to deliver provisioning data that allows the TCU to access that carrier's network, the SDARS provider, or an entity transmitting over Wi-Fi serves as an intermediary. Thus, a user or subscriber of that intermediary's service, such as, e.g., a SDARS subscriber, can request sending of provisioning data to a vehicle directly from the SDARS operator.

It is noted that the disclosed functionality may be particularly useful for easily switching carriers as one crosses a border. For example, in North America, along both the Canadian and the Mexican borders with the United States, various people tend to cross the border frequently. If a domestic cellular network for the United States is the cellular carrier for the TCU, then roaming charges are incurred on the non-U.S. side of the border, and vice versa. Depending upon how long a vehicle spends outside the US, and what quantity of data is transceived over the cellular network, this can be expensive. A convenient solution would be to automatically switch carriers when crossing the border. Using the GPS data to know when to effect the change, the TCU may be programmed to switch cellular carriers from a US carrier (e.g., Verizon, T-Mobile, etc.) to a Canadian one, for example, and operate on that network as long as the vehicle is in Canada. The provisioning data for the switch between carriers maybe provided by an SDARS network, as shown in FIG. 5, or over a Wi-Fi network, as shown in FIG. 6. The vehicle's TCU would obviously need a SIM card for the Canadian cellular carrier to have been pre-installed.

It is here also noted that basically one may switch carriers on the fly if one has both provisioning profiles. Thus, in exemplary embodiments of the present invention a TSP or SDARS service can switch back and forth between SIMs and associated carriers as often as desired. In some embodiments this may not be done in practice, inasmuch as once a TCU is put into one carrier it will probably stay with that carrier for the service period, unless something major happens. However, if needed, multiple switches may be done in various exemplary embodiments.

Similarly, in a more permanent scenario, the disclosed functionality may be used when a new vehicle is imported to a given country, and cellular service there available on one of the approved carriers is easily chosen, provisioned and turned on. For example, many foreign made automobiles are imported into the United States each year. They often are provided with a telematics system, and generally an SDARS unit as well. It is not always known a priori which of many possible cellular carriers the telematics service or, for example, the user, may decide to use. Using the disclosed invention, it only need be known at the time of manufacture which options are available, and appropriate SIM cards, or equivalent, for each option provided and approved. Once the vehicle is delivered, or sold, a carrier associated with the pre-installed SIMs may be chosen and appropriately provisioned.

Another situation in which the disclosed functionality may be used is when, for example, a customer sells a car or gives it to their wife, child, relative or the like, and the person who is the new owner of the car has a different carrier than that with which the car is currently provisioned. In such case, it can be useful to switch over to the new owner's carrier so that the new owner could obtain the benefit of having both his car and his or her cell phone on the same carrier's network. Many carriers will provide a financial incentive to users to effect a switch in such a case.

A latitude of modification, change, and substitution is intended in the foregoing disclosure and in some instances, some features of the invention will be employed without a corresponding use of the other features. For example, the system of the invention may use various numbers N of SIM cards in the TCU, and the TCU may include modules for receiving various cellular network signals, SDARS signals, Wi-Fi or other wireless signals, in various combinations. Initial provisioning, or switches between carriers once already subscribed to a different carrier, may take place using provisioning data received over any available path to the TCU, as may be most convenient or useful.

Accordingly, it is appropriate that the appended claims be construed broadly and in a manner consistent with the spirit and scope of the invention as disclosed.

What is claimed:

1. A telematics control unit, comprising:
 a cellular modem configurable to operate with a plurality of carrier networks, each of the carrier networks being associated with a first SIM card associated with a first carrier network and a second SIM associated with a second carrier network, wherein the first SIM card is a non-active SIM card;

a communication module configured to receive provisioning data for the cellular modem;

a telematics processor communicatively connected to the cellular modem and the communication module and provided in a LTE/HSPA and GPS module, the telematics processor configured to receive the provisioning data from the communications module and transmit the provisioning data to the cellular modem;

wherein the cellular modem activates the inactive first SIM card associated with the provisioning data, programs the first inactive SIM card, restarts using the first inactive SIM card, and establishes a wireless communication channel via the carrier network associated with the activated first SIM based on the received provisioning data.

2. The telematics control unit according to claim 1, wherein the communications module is a satellite module.

3. The telematics control unit according to claim 2, wherein the satellite module is a SDARS (Satellite Digital Audio Receiver System) module.

4. The telematics control unit according to claim 3, wherein the SDARS module is assigned with a module ID.

5. The telematics control unit according to claim 4, wherein the provisioning data is addressed to the cellular modem based on the module ID and a cellular ID.

6. The telematics control unit according to claim 1, wherein the activated SIM was not activated prior to receiving the provisioning data.

7. The telematics control unit according to claim 1, wherein the communications module is a Wi-Fi module, and wherein the provisioning data is received over a Wi-Fi network.

8. The telematics control unit according to claim 1, wherein the provisioning data includes a telephone number.

9. A computer-implemented method comprising:

receiving, via a communications module and provided in a LTE/HSPA and GPS module, a provisioning data from a telematics processor for a cellular modem configurable to operate with a plurality of carrier networks, each of the carrier networks being associated with a respective SIM card, wherein at least one SIM card is non-active; and based on the received provisioning data, received at the cellular modem:
  selecting the at least one non-active SIM card;
  programming the selected at least one non-active SIM card;
  restarting the cellular modem using the selected at least one non-active SIM card; and
  establishing a wireless communication channel via the carrier network associated with the selected SIM card.

10. The method according to claim 9, wherein the communications module is a satellite module.

11. The method according to claim 10, wherein the satellite module is a SDARS (Satellite Digital Audio Receiver System) module.

12. The method according to claim 11, wherein the SDARS module is assigned with a module ID.

13. The method according to claim 12, wherein the provisioning data is addressed to the cellular modem based on the module ID and a cellular ID.

14. The method according to claim 9, wherein the selected SIM was not activated prior to receiving the provisioning data.

15. The method according to claim 9, wherein the communication module is a Wi-Fi module and the provisioning data is received over a Wi-Fi network.

16. The method according to claim 9, wherein the provisioning data includes a telephone number.

* * * * *